Patented Feb. 18, 1941

2,232,282

UNITED STATES PATENT OFFICE 2,232,282

PROCESS FOR CANNING BEANS AND THE LIKE

Fred Struble, Berkeley, Calif.

No Drawing. Application July 21, 1939, Serial No. 285,725

22 Claims. (Cl. 99—186)

This invention relates to a process for treating seed-like comestibles such as beans and the like and more particularly relates to a method of treating such products for enclosing them in hermetically sealed containers, commonly referred to as "canning."

While such products may embrace numerous types of seed-like comestibles which are dried subsequent to harvest and prior to canning, such as peas and beans, the invention will be described with relation to beans of various types as representing an example of an efficient field for employment of the process.

While it is not necessary to detail herein all known processes for canning beans, it may be stated that the art is an old one and is sometimes referred to generally as "baked beans", though in reality such canned beans may be separated into two groups, canned beans and oven-baked canned beans. In either case a suitable sauce or strip of pork or the like may be added. The treatment of the beans by this invention may be employed with either of the aforesaid types of cooking.

In general, two processes have heretofore been employed in treatment of dried or desiccated beans for canning. The first one, referred to herein as the soaking method, includes the soaking of the dried beans for an extended period and then cooking them at a sterilizing temperature in a sealed can with a volume of liquid, either with or without par-boiling them intermediate the soaking and the placing of them in the cans. The second or can-pack method includes placing the beans in a volume of liquid, usually a brine or sauce, in a hermetically sealed container without soaking, subjecting them to an initial cooking at substantially a boiling temperature for an extended period in the sealed container and then further cooking them for sterilization. In both cases, as is also true in the present invention, usual and well-known steps are taken of initially passing the dried beans through a dry cleaner or a rinser to remove dust, loose dirt, pieces of hull, etc., then passing the beans to a picking belt of any suitable type where the beans are inspected and defective beans and foreign items are removed. The final cooking and sterilization within hermetically sealed cans may be the same in all instances, since the employment of the initial steps of cleaning the beans and the final step of cooking have been practiced for a great many years. The essential difference in the present invention as compared with prior methods is the discovery that after the step of cleaning, the soaking of the beans for a considerable period of time may be eliminated from the first of the known methods, and the initial cooking of the beans for an extended period within the sealed can may be eliminated from the second known method. Stated briefly, it has been discovered that a better product may be obtained by rinsing, culling, par-boiling or blanching, cooling the blanched beans and then immediately sealing the par-boiled beans in hermetically sealed cans and subjecting them to a single cooking operation within the can while subjecting the can to pressure.

In order that the advantages of this invention may be appreciated, it is necessary to describe in some detail the care, time and expense heretofore believed necessary in the step of soaking beans for canning in the first of said known methods above referred to, and also to describe the disadvantages which are overcome in the second of said known methods above referred to, of par-boiling the beans in sealed cans without a previous soaking thereof.

In the first of said known methods, after removing foreign matter from the accepted beans, the next step is generally that of soaking. Experienced care must be exercised in determining the length of time for the soaking period as this will depend upon the moisture content of the beans and the temperature of the soaking water. Beans having high moisture content soak much more readily than those having a lower moisture content. The moisture content of choice hand-picked beans may vary from 10% to 20%. Such beans are usually soaked in from 8 to 10 hours. Beans which have been in storage for a long time and are very dry may require 12 to 18 hours or even longer for complete soaking. Soaking is ordinarily done in cold water, preferably allowing a stream of fresh water to flow through the tanks throughout the soaking period in order to eliminate the possibility of fermentation. In order to obtain a uniform pack the soaking period should be so regulated that all beans have the same moisture content after soaking. Moisture uniformity is more easily accomplished through the use of a number of small soaking tanks rather than a few large ones. With this arrangement the dry beans may be filled into the tanks during the day and the tanks filled with water at intervals during the night. The time at which each tank of beans is started to soak may be determined by the rate at which they will be emptied on the following day. In this way, each tank of beans will soak for the same length of time. Tanks having a capacity of from fifty to sixty bushels of dry beans are a convenient size as the average line production will be about 150 cases per hour which will require about one tank of soaked beans per hour. Two or more lots of beans of different moisture content should not be mixed during the soaking period as this will make it practically impossible to regulate the soak to result in a uniform pack. Beans should never be soaked longer than is necessary for them to take up the maximum amount of water. Over-soaking will result in a soft, mushy product, inability to affect proper sauce absorption, and may result in some discoloration. Prolonged soaking also results in the leaching of considerable solid material from the beans and in an increased percentage of splits and loose skins. Metal tanks made of materials other than iron or copper are generally employed for soaking beans. Galvanized or heavily tinned iron tanks may be used provided that the galvanized or tin coating is continuous and unbroken. Glass lined, aluminum, or stainless steel tanks are preferable, though they are more expensive. Wood tanks have been used but are not to be recommended, for bacterial contamination and off-flavors in the product frequently occur when they are used. After soaking, the beans may be flushed from the soaking tanks over a cascade type washer and cleaner. This device removes the stones and some of the split beans. Depending upon plant design, the beans are either elevated directly from the cascade washer into the blancher or descend to the blancher from the floor above. Dry beans are very sensitive to excessive hardness in the soaking water. Water for soaking dry beans should be below 200 parts per million total hardness. When hard water is used the skins of the beans become hard and proper absorption of water by the interior of the bean is inhibited. Beans soaked in hard water show tough skins and a hard texture in the finished product. An excessive alkalinity in the water used will cause the beans to disintegrate somewhat and become soft and mushy. The beans to be packed in a given day should be started to soak at various times during the previous evening so that all the beans have been given the same length of soak at the time of canning. The soaking water should be changed during the night, particularly in warm weather, to prevent fermentation of the beans. The soaking is followed by par-boiling prior to placing the beans is hermetically sealed cans with brine or sauce (and, if preferred, a strip of bacon or pork), for a further high temperature pressure-cooking known as processing.

This description of the difficulties encountered, expense and time employed in a soaking process, serves to demonstrate the advantages of employment of the method of the invention herein. This soaking saturates the beans with water which serves only to make its skin soft and liable to split and to make the body soft and pulpy, making the beans thereafter difficult to handle. The absorption of water into the body of the bean does not add to its flavor, and actually serves to prevent the sauce in which the bean is finally canned from fully and thoroughly being absorbed throughout the entire body of the bean. As a matter of fact, a soaking operation which saturates the entire body of the bean impregnates the entire body of the bean with water which is a vehicle for a characteristic bitter raw flavor which normally is located in or close to the skin of the bean.

Manifestly, with the first-mentioned or soaking method the beans have substantially exhausted their absorptive characteristics by the time they are sealed with the sauce in the can, and if they have further impregnation by the sauce it is by osmotic phenomena, and the beans do not absorb the sauce and flavor throughout their body. This may be readily demonstrated by rinsing the sauce from the beans of a can processed by the soaking method, and it will be found that the beans themselves lack the rich flavor of the sauce.

The second known method, or the "can pack" method above referred to eliminates the disadvantages of soaking but in place thereof has other disadvantages equally difficult to overcome since it does not make provision for removal of free starch and elimination of a pronounced somewhat bitter flavor which the beans impart to the first hot solution in which they are immersed. In this second known process the accepted or selected raw beans after rinsing are passed directly into the can in which they are finally enclosed, processed and sold. When the raw beans are in the can with a desired quantity of brine or sauce, sufficient to supply the beans with what liquid they will absorb and enough additional liquid to provide a free unabsorbed sauce within the can, the cans are then passed through a can-closing machine and hermetically sealed. The cans are then placed in a retort at atmospheric pressure at a cooking temperature of approximately 212° F. for a period of forty-five to ninety minutes. Then the cans are subjected to a well-known and standard further and higher cooking temperature of approximately 240° F. for about ninety minutes while maintaining a surrounding pressure in the heating chamber sufficient to prevent bulging or leaking of the can due to the confined steam pressure within the can from the higher temperature, and then the cans are cooled while still under pressure.

It will be noted that the second mentioned or "can pack" method eliminates the step of soaking, but requires the step of a prolonged initial cook within the hermetically sealed can. It makes the beans agglomerate in the can, causes the beans to include free starchy material which has not been removed prior to placing in the can, requires a step of jolting or jarring the canned beans to prevent agglomeration, and fails to provide any step or means for removing the characteristic bitterness which is frequently present, and which is removed under the method of my invention.

This can pack method also has the very decided disadvantage that it offers no opporounity to sort the beans and remove defective ones after any exposure of them to immersion in a hot liquid. Defects in dried beans such as cracked kernals or bodies and split skins, do not become apparent in commercial operation until the beans are subjected to immersion in heated liquid. The presence of such defective beans may also be the cause for agglomeration in this type of canning, since the body of the bean not encased by a skin, or encased in a split or broken skin, readily dissolves into the sauce in which the beans are finally cooked.

In the process of my invention, I have discovered that all of the expense and detail of the above-described soaking operation may be eliminated from the first of said known methods, and the first cooking within the can may be eliminated from the other known method.

In carrying out my process, I rinse the desiccated or dried beans, or the like, to remove dirt, pebbles, and other foreign matter. I then subject the beans to a blanch or par-boiling sufficiently to soften the skin and the outer portion of the bean body without materially affecting the absorptive properties of the central portion of the bean body. This par-boiling is preferably by immersion in hot water, since it requires no further rinsing than draining off the blanch water, but it is to be understood that the step of such blanching may be carried out by subjecting the beans to a steam bath and subsequently rinsing them to remove free starch and a characteristic bitter or raw flavor, which are removed in the blanch water where the latter is employed.

No exact rule of time and temperature can be stated for the blanch or par-boiling, because it will depend on the type of bean, the degree of dryness of the bean, and the desired softness of texture, and, to a lesser extent, the character of sauce to be employed. It is obvious that some heat and moisture are always present in the atmosphere under ordinary living and working conditions, but from the next following examples it will be apparent that in referring to heat and moisture in the claims, the heat temperature is an increased heat above the normal atmospheric room temperatures where canning operations are carried out, such as a range of 60° to 90° F., and that the moisture referred to in the claims is likewise an induced or created moisture of greater degree than that of the ordinary atmospheric moisture present under such operating conditions. The blanching may cover a range of both time and temperature from two minutes at 212° F. to twenty minutes at 140° F. with variation of time and temperature approximately in inverse order to the difference of time and temperature; that is, the variation in time is eighteen minutes and the difference in temperature is 72°. So for each increase of one minute above the minimum time, decrease the temperature 1/18 of 72°, or approximately 4°. A general rule for blanching average beans would approximate 170° to 180° for approximately ten to twelve minutes. After blanching the beans, they are immediately cooled to a temperature of approximately 70° F., preferably by sprays of running water. While no definite theory is advanced as to the physical or chemical reaction caused by this step of the immediate cooling of the beans, it does render them unusually susceptible to penetration of moisture and imparts a firmness to the exterior of the bean so that they can be handled with less damage, probably by reason of setting the starch in the exterior portion of the bean body. It is preferred that this cooling after blanching shall be performed by sprays or running water as this washes the frequently bitter taste or flavor which is removed from the beans by the blanch water, and also washes off any free starch particles so that the latter are not deposited in the liquid or sauce into which the beans are subsequently immersed.

In the case of beans which are usually susceptible to splitting, it is sometimes desirable to temper the beans to the blanching step by originally washing them in water at about 120° instead of cold water or subjecting them to a preliminary blanch at about 120° for a minute or two and then conveying them immediately to the higher temperature blanch without intermediate cooling. Since the blanching makes apparent the defective beans, it is desirable to pass the beans over picking tables immediately after blanching and cooling, in order that the split and defective seeds and other foreign materials may be removed.

After the blanching step followed by immediate cooling and removal of the defective beans, the non-defective accepted beans are filled into cans and a suitable brine or sauce is added thereto, the constituents of which will vary according to individual preferences for flavor and consistency. There should be sufficient of the brine or sauce to allow for absorption by the beans to the limit of their absorptive capacity and a sufficient amount in addition so that there will be an unabsorbed remainder to keep the beans well covered as a finished product. The filling of the cans may be done either by hand or machine. The added brine or sauce should be hot enough when added to give the desired closing temperature to produce a proper vacuum within the can when it is sealed. However, the same result may be accomplished by adding the brine or sauce at a lower temperature than necessary for the closing operation of the can and then obtaining the necessary closing temperature by heating the filled but unsealed can to the desired closing temperature by passing them through an exhaust box. The cans are then, preferably while still hot, hermetically sealed in any suitable can-closing machine, and then subjected to a single cooking process while subject to external pressure to prevent can-bulging. This final cooking, usually called processing, is an old and well-known step in the canning art, and is carried out in this invention in the same manner as with other processes, followed by the well-known step of cooling. This final cooking is also for sterilization of the canned product and is usually accomplished by a temperature above boiling, it being generally accepted as sufficient if the cans are subjected to 240° F., for upward of ninety minutes.

In canning beans, the type of container almost universally employed is cylindrical in plan and having a side wall parallel with the axis which is perpendicular to the top and bottom of the container. In my process, since further absorption by the beans takes place in the can, the filled and sealed cans should receive this final cooking and cooling in an axial horizontal position to prevent packing or agglomeration in the bottom of the cans, since this positioning of the cans provides a trough with upwardly and outwardly diverging side walls to allow for further swelling of the beans during cooking.

The process herein set forth may be followed in the same manner in the preparation of oven baked beans. In preparing oven baked beans for canning, the same steps as above set forth should be followed except that after the blanching and the immediately following cooling, washing, and selective inspection, the beans are baked in a receptacle, either dry or in a sauce. Usually a baking in the oven for forty-five minutes to one hour at a temperature of approximately 300° F., gives good results. The oven baked beans may then be filled in the cans, sealed, cooked, and cooled in the same manner as outlined above.

In my process, only about one-third of the absorption capacity of the bean is utilized in the step or par-boiling or blanching, leaving about two-thirds of the total absorption capacity for sauce penetration, yet I avoid solubilizing the starch and soluble mineral and vegetable food values throughout the bean and passing off a great portion of those values with the soaking water. I also avoid softening the bean throughout its body, which results in a mushy pasty product, and while I tenderize the skin, I minimize splitting of the skin or loosening the skin from the bean body. At the same time I eliminate the free starch in the outer portion of the bean body so that it does not make the sauce pasty or glutinous in the can as in the "can-pack" method, and accomplish a first cook or par-boiling blanch in 2 to 20 minutes, whereas the "can-pack" method requires 45 to 90 minutes. In respect of the latter method, I also preserve the advantageous step of sorting out the defective beans after the beans are subjected for the first time to immersion in hot water; my method also eliminates the bitterness which is washed off with the blanch water. The resultant product of my process is a greatly superior product in texture of bean body and tenderness of the skin and flavor throughout the bean. Tests made on a comparable basis with the other two methods cited disclose that by following my method a greater number of cans may be filled from an equal quantity of raw beans, probably due to the greater reserve of absorptive capacity of the beans after they are sealed in the can as compared with the soaking method.

Under my process, the par-boiling or blanching is only for a sufficient time and at sufficiently high temperature to soften the outer portion or layer of the bean body and leaves the more central portion of the bean body substantially intact so far as its absorptive properties are concerned, so that the absorption by the beans after being placed in cans accompanied by the brine or sauce is an actual absorption of the liquid brine or sauce to the unsaturated central portion of the bean, the blanching having softened the skin and exterior portion of the bean body to facilitate such absorption.

I claim:

1. A method of canning beans which have been desiccated, including the steps of subjecting said products to induced heat in the presence of moisture until the outer portion of the body of the product absorbs moisture while maintaining the central portion of the body of the product substantially free of such absorption of moisture, hermetically sealing the product in containers in the presence of liquid and subjecting said sealed containers and products therein to a cooking temperature sufficiently high to sterilize the product within the container.

2. A method of canning beans which have been desiccated, including the steps of subjecting said products to induced heat in the presence of moisture in their desiccated condition until the outer portion of the body of the product absorbs moisture while maintaining the central portion of the body of the product substantially free of such absorption of moisture, hermetically sealing the product in containers in the present of liquid, and subjecting said sealed containers and products therein to a cooking temperature sufficiently high to sterilize the product within the container.

3. A method of canning beans which have been desiccated, including the steps of subjecting said products to induced heat in the presence of moisture until the outer portion of the body of the product absorbs moisture while maintaining the central portion of the body of the product substantially free of such absorption of moisture, then rinsing the product and thereafter hermetically sealing the product in containers in the presence of liquid, and subjecting said sealed containers and products therein to a cooking temperature sufficiently high to sterilize the product within the container while maintaining an external pressure on the container greater than atmospheric.

4. A method of canning beans which have been desiccated, including the steps of subjecting said products to induced heat in the presence of moisture until the outer portion of the body of the product absorbs moisture while maintaining the central portion of the body of the product substantially free of such absorption of moisture, then rinsing the product and thereafter hermetically sealing the product in containers in the presence of liquid and subjecting said sealed containers and products therein to a cooking temperature sufficiently high to sterilize the product within the container, and maintaining the containers with their longitudinal axis horizontal during the cooking operation.

5. A method of canning beans which have been desiccated, including the steps of subjecting said products to induced heat in the presence of moisture until the outer portion of the body of the product absorbs moisture while maintaining the central portion of the body of the product substantially free of such absorption of moisture, then rinsing the product and thereafter hermetically sealing the product in containers in the presence of liquid and subjecting said sealed containers and products therein to a cooking temperature sufficiently high to sterilize the product within the container while maintaining an external pressure on the container greater than atmospheric, and maintaining the containers with their longitudinal axis horizontal during the cooking operation.

6. A method of canning beans which have been desiccated, including the steps of subjecting said products to induced heat in the presence of moisture until the outer portion of the body of the product absorbs moisture while maintaining the central portion of the body of the product substantially free of such absorption of moisture, then cooling the product, hermetically sealing the product in containers in the presence of liquid, and subjecting said sealed containers and products therein to a cooking temperature sufficiently high to sterilize the product within the container.

7. A method of canning beans which have been desiccated, including the steps of subjecting said products to induced heat in the presence of moisture until the outer portion of the body of the product absorbs moisture while maintaining the central portion of the body of the product substantially free of such absorption of moisture, then rinsing and cooling the product, and thereafter hermetically sealing the product in containers in the presence of liquid, and subjecting said sealed containers and products therein to a cooking temperature sufficiently high to sterilize the product within the container.

8. A method of canning beans which have been desiccated, including the steps of subjecting said products to induced heat in the presence of moisture until the outer portion of the body of the product absorbs moisture while maintaining the central portion of the body of the product substantially free of such absorption of moisture, then cooling the product, hermetically sealing the product in containers in the presence of liquid, and subjecting said sealed containers and products therein to a cooking temperature sufficiently high to sterilize the product within the container while maintaining an external pressure on the container greater than atmospheric, and maintaining the containers with their longitudinal axis horizontal during the cooking operation.

9. A method of canning beans which have been desiccated, including the steps of subjecting said products to induced heat in the presence of moisture for a variable period of time in excess of approximately one minute and at variable temperatures in excess of approximately 140° F. until the outer portion of the body of the product absorbs moisture while maintaining the central portion of the body of the product substantially free of such absorption of moisture, then cooling the product, hermetically sealing the product in containers in the presence of liquid and subjecting said sealed containers and products therein to a cooking temperature sufficiently high to sterilize the product within the container, said variable of time and temperature being approximately twenty minutes at 140° F. as a base, and the temperature being varied inversely to the time in the ratio of approximately 4° upwardly for each variation of time one minute downwardly.

10. A method of canning beans which have been desiccated, including the steps of subjecting said products to induced heat by immersion in hot water until the outer portion of the body of the product absorbs moisture while maintaining the central portion of the body of the product substantially free of such absorption of moisture, hermetically sealing the product in containers in the presence of liquid and subjecting said sealed containers and products therein to a cooking temperature sufficiently high to sterilize the product within the container.

11. A method of canning beans which have been desiccated, including the steps of subjecting said products to induced heat by immersion in hot water in their desiccated condition until the outer portion of the body of the product absorbs moisture while maintaining the central portion of the body of the product substantially free of such absorption of moisture, hermetically sealing the product in containers in the presence of liquid and subjecting said sealed containers and products therein to a cooking temperature sufficiently high to sterilize the product within the container.

12. A method of canning beans which have been desiccated, including the steps of subjecting said products to induced heat by immersion in hot water until the outer portion of the body of the product absorbs moisture while maintaining the central portion of the body of the product substantially free of such absorption of moisture, then cooling the product, hermetically sealing the product in containers in the presence of liquid and subjecting said sealed containers and products therein to a cooking temperature sufficiently high to sterilize the product within the container, while maintaining an external pressure on the container greater than atmospheric.

13. A method of canning beans which have been desiccated, including the steps of subjecting said products to induced heat by immersion in hot water until the outer portion of the body of the product absorbs moisture while maintaining the central portion of the body of the product substantially free of such absorption of moisture, then rinsing and cooling the product, hermetically sealing the product in containers in the presence of liquid and subjecting said sealed containers and products therein to a cooking temperature sufficiently high to sterilize the product within the container while maintaining an external pressure on the container greater than atmospheric, and maintaining the containers with their longitudinal axis horizontal during the cooking operation.

14. A method of canning beans which have been desiccated, including the steps of subjecting said products to induced heat by immersion in hot water, for a variable period of time in excess of approximately one minute and at variable temperatures in excess of approximately 140° F. until the outer portion of the body of the product absorbs moisture while maintaining the central portion of the body of the product substantially free of such absorption of moisture, then cooling the product, hermetically sealing the product in containers in the presence of liquid and subjecting said sealed containers and products therein to a cooking temperature, sufficiently high to sterilize the product within the container, said variable of time and temperature being approximately twenty minutes at 140° F. as a base, and the temperature being varied inversely to the time in the ratio of approximately 4° upwardly for each variation of time one minute downwardly.

15. A method of canning beans which have been desiccated, including the steps of subjecting said products to induced heat by immersion in hot water for a variable period of time in excess of approximately one minute and at variable temperatures in excess of approximately 140° F. until the outer portion of the body of the product absorbs moisture while maintaining the central portion of the body of the product substantially free of such absorption of moisture, then rinsing and cooling the product, hermetically sealing the product in containers in the presence of liquid and subjecting said sealed containers and products therein to a cooking temperature sufficiently high to sterilize the product within the container while maintaining an external pressure on the container greater than atmospheric, and maintaining the containers with their longitudinal axis horizontal during the cooking operation, said variable of time and temperature being approximately twenty minutes at 140° F. as a base, and the temperature being varied inversely to the time in the ratio of approximately 4° upwardly for each variation of time one minute downwardly.

16. A method of canning beans which have been desiccated, including the steps of subjecting said products to induced heat by immersion in hot water for a variable period of time in excess of approximately one minute and at variable temperatures in excess of approximately 140° F. until the outer portion of the body of the product absorbs moisture while maintaining the central portion of the body of the product substantially free of such absorption of moisture, then rinsing and cooling the product, culling the defective items from said product, hermetically sealing the product in containers in the presence of liquid and subjecting said sealed containers and products therein to a cooking temperature sufficiently high to sterilize the product within the container while maintaining an external pressure on the container greater than atmospheric and maintaining the containers with their longitudinal axis horizontal during the cooking operation, said variable of time and temperature being approximately twenty minutes at 140° F. as a base, and the temperature being varied inversely to the time in the ratio of approximately 4° upwardly for each variation of time one minute downwardly.

17. A method of heat treating and canning edible vegetable products, including the steps of subjecting such products of the class consisting of beans and peas which have been desiccated to induced heat in the presence of moisture until the outer portion of the body of the product absorbs moisture while maintaining the central portion of the body of the product substantially free of such absorption of moisture, hermetically sealing the product in containers in the presence of liquid and subjecting said sealed containers and products therein to a cooking temperature sufficiently high to sterilize the product within the container.

18. A method of heat treating and canning edible vegetable products, including the steps of subjecting such products of the class consisting of beans and peas which have been desiccated to induced heat in the presence of moisture in their desiccated condition until the outer portion of the body of the product absorbs moisture while maintaining the central portion of the body of the product substantially free of such absorption of moisture, hermetically sealing the product in containers in the presence of liquid, and subjecting said sealed containers and products therein to a cooking temperature sufficiently high to sterilize the product within the container.

19. A method of heat treating and canning edible vegetable products, including the steps of subjecting such products of the class consisting of beans and peas which have been desiccated to induced heat in the presence of moisture for a variable period of time in excess of approximately one minute and at variable temperatures in excess of approximately 140° F. until the outer portion of the body of the product absorbs moisture while maintaining the central portion of the body of the product substantially free of such absorption of moisture, then cooling the product, hermetically sealing the product in containers in the presence of liquid and subjecting said sealed containers and products therein to a cooking temperature sufficiently high to sterilize the product within the container, said variable of time and temperature being approximately twenty minutes at 140° F. as a base, and the temperature being varied inversely to the time in the ratio of approximately 4° upwardly for each variation of time one minute downwardly.

20. A method of heat treating and canning edible vegetable products, including the steps of subjecting such products of the class consisting of beans and peas which have been desiccated to induced heat by immersion in hot water until the outer portion of the body of the product absorbs moisture while maintaining the central portion of the body of the product substantially free of such absorption of moisture, hermetically sealing the product in containers in the presence of liquid and subjecting said sealed containers and products therein to a cooking temperature sufficiently high to sterilize the product within the container.

21. A method of heat treating and canning edible vegetable products, including the steps of subjecting such products of the class consisting of beans and peas which have been desiccated to induced heat by immersion in hot water in their desiccated condition until the outer portion of the body of the product absorbs moisture while maintaining the central portion of the body of the product substantially free of such absorption of moisture, hermetically sealing the product in containers in the presence of liquid and subjecting said sealed containers and products therein to a cooking temperature sufficiently high to sterilize the product within the container.

22. A method of heat treating and canning edible vegetable products, including the steps of subjecting such products of the class consisting of beans and peas which have been desiccated to induced heat by immersion in hot water, for a variable period of time in excess of approximately one minute and at variable temperatures in excess of approximately 140° F. until the outer portion of the body of the product absorbs moisture while maintaining the central portion of the body of the product substantially free of such absorption of moisture, then cooling the product, hermetically sealing the product in containers in the presence of liquid and subjecting said sealed containers and products therein to a cooking temperature, sufficiently high to sterilize the product within the container, said variable of time and temperature being approximately twenty minutes at 140° F. as a base, and the temperature being varied inversely to the time in the ratio of approximately 4° upwardly for each variation of time one minute downwardly.

FRED STRUBLE.